United States Patent

[11] 3,577,145

[72] Inventors Robert A. Worden
 Eaton;
 Hugh H. Hair, Liverpool; Carl W. Gerst,
 Skaneateles; Benadict Viglietta, Clinton,
 N.Y.
[21] Appl. No. 849,719
[22] Filed Aug. 13, 1969
[45] Patented May 4, 1971
[73] Assignee The United States of America as represented by the Secretary of the Air Force

[54] RADAR SYSTEM SPIN ECHO CORRELATOR
 4 Claims, 19 Drawing Figs.
[52] U.S. Cl. .................................................. 343/17.2PC,
 235/181, 324/0.5R
[51] Int. Cl. ........................................................ G01s 9/24

[50] Field of Search........................................... 343/17.2,
 17.2 (PC); 235/181; 324/0.5

[56] References Cited
 UNITED STATES PATENTS
 3,265,961 8/1966 Mims............................ 324/0.5
 Primary Examiner—T. H. Tubbesing
 Attorneys—Harry A. Herbert, Jr. and Willard R. Matthews, Jr.

ABSTRACT: The spin properties of paramagnetic materials are utilized to provide a correlator of radar signals. Paramagnetic materials having an in homogeneous resonance line and relatively long spin-spin and spin-lattice relaxation times such as phosphorous-doped silicon are placed into a coupling structure which couples RF energy to the magnetic spin system. Such a structure can be a simple tuned LC oscillator for low-frequency operation or a microwave cavity or slow wave structure for microwave operation.

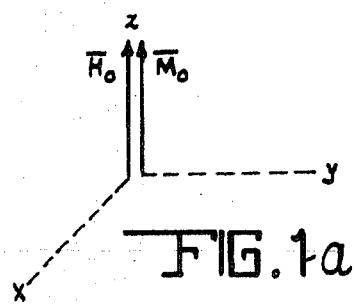
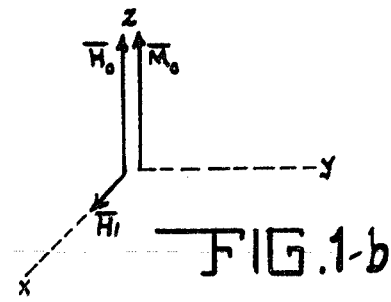
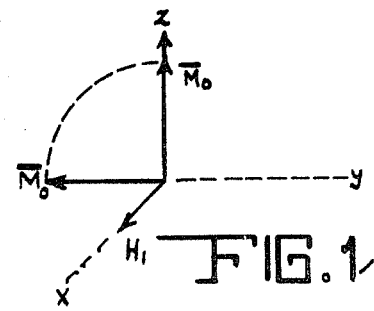
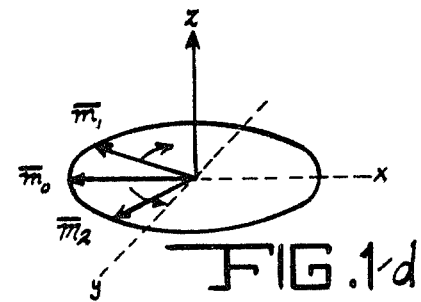
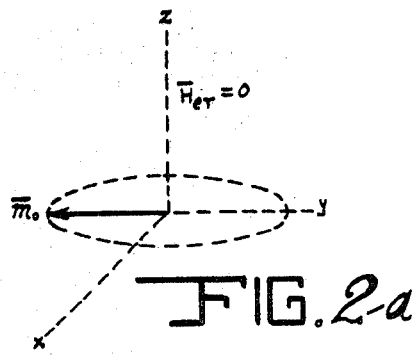
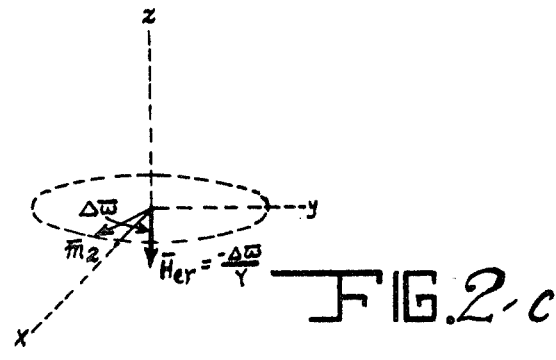
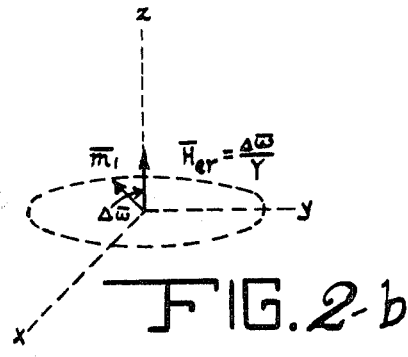

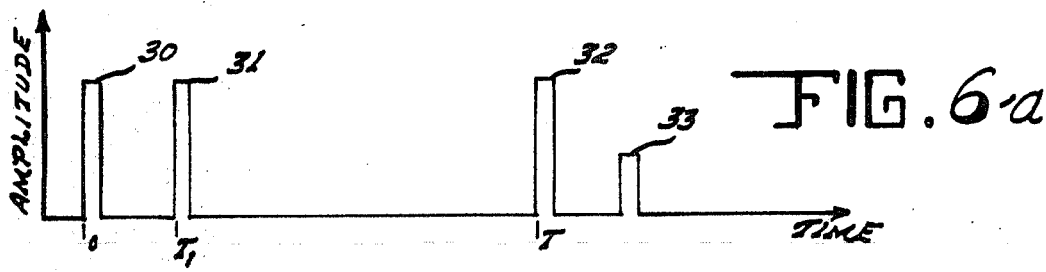
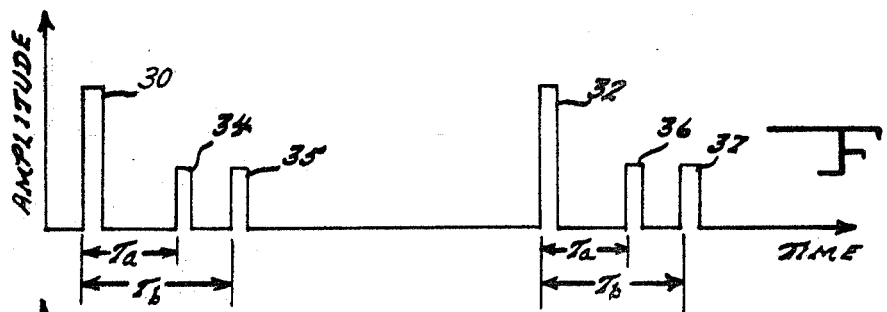
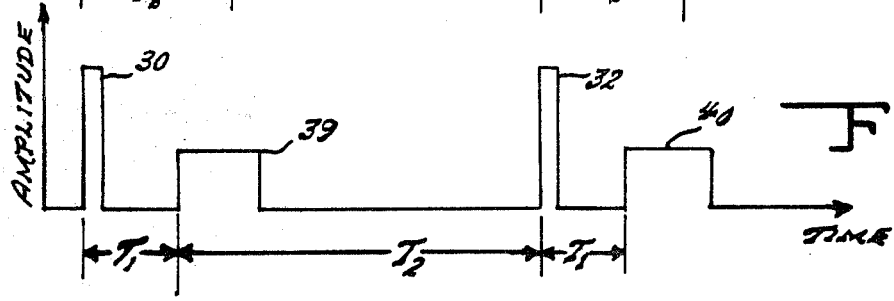
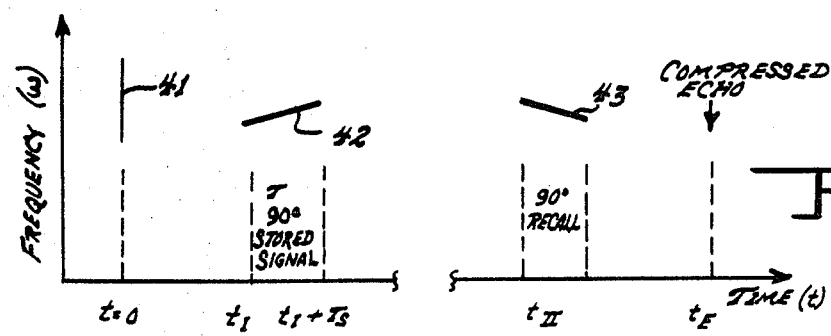
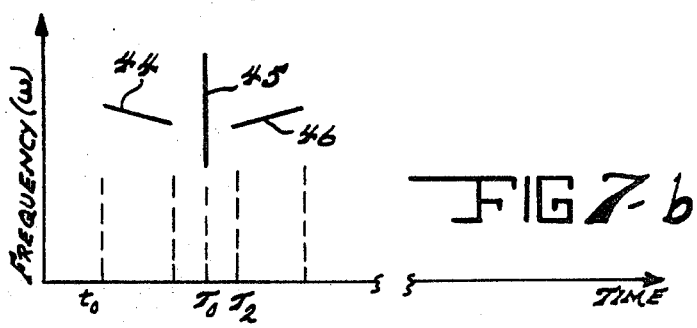

INVENTORS
ROBERT A. WORDEN
HUGH H. HAIR
CARL W. GERST
BY BENADICT VIGLIETTA

*Harry A. Herbert Jr.*
*Willard R. Matthews and*
ATTORNEYS 3,577,145

1

RADAR SYSTEM SPIN ECHO CORRELATOR

BACKGROUND OF THE INVENTION

This invention relates to radar systems and to pulse compression devices used therein and in particular to a spin echo correlator utilizing paramagnetic materials to effect auto correlation of signals directly at the signal frequency.

The technique of radar pulse compression using signal correlation to produce improvement in signal to noise ratio has wide application in the radar art. Complex schemes using dispersive delay lines have been used to produce the desired results. These schemes, however, are complex and unwieldy since signal frequency translation and time reversal are required. Furthermore radar waveforms in these cases are limited to simple linear FM waveforms due to device constraint. Various attempts have been made to provide a correlator of general waveforms. These approaches have comprehended the interaction of coherent light and microwave acoustic waves. Such schemes, however, have not been practical because of limitation in efficiency and in microwave acoustic and coherent light technology.

A radar pulse compression scheme utilizing $\pi$ recall spin echo techniques is also known to the prior art. Such a scheme disclosed in the periodical article The Detection of Chirped Radar Signals by Means of Electron Spin Echoes by W. B. Mims, Proceedings of IEEE page 1,127, Aug. 1963. Using this approach, however, signals can only be stored for time periods approaching the material spin-spin relaxation time. Furthermore, this is not a correlation approach and for a general waveform the recalling waveform is not simply related to the input waveform. The approach is thus also limited to simple waveform such as the linear chirp waveform.

SUMMARY OF THE INVENTION

A paramagnetic material such as phosphorous-doped silicon is placed into a coupling structure (such as a microwave cavity) which couples RF energy into the material magnetic spin system. The material is placed in a region of the structure where the RF magnetic field can interact with the spin magnetic moments of the material.

The magnetic spins are biased to resonance at the desired operating frequency by a DC biasing magnetic field. The resonant frequency is chosen to be centered at the RF signal frequency. When the above conditions are met, then an auto correlator device can be operated. The following is a description of the process: An RF signal, $S(t)$, is introduced to the magnetic system through the electromagnetic coupler. The signal information is stored in the phase and amplitude of precessing spin magnetic moments. A short $\pi/2$ pulse, $\delta(t)$, is applied to the spin system at a time $T_a$. This pulse is necessary to produce a $\pi/2$ angular rotation of the precessing magnetic moments. This $\pi/2$ angular shift places components of the magnetization in "storage" along the DC biasing field direction. If an identical signal, $s(t)$, is applied to the system at time $T_a + T_b$, then the auto correlation function for the signal appears at time $T_c = 2T_a + T_b$, where $T_a$ is the time between when the initial signal was sorted and the $\pi/2$ pulse. Similar results can be obtained if the order of the signal $S(t)$ and the $\pi/2$ pulse, $\delta(t)$ are interchanged. In this case, however, the recalling signal must be the time reversed input signal (time-mirror imagine of the input signal). This technique still produces the correlation function at time $T_c = 2T_a + T_b$ but is more difficult to instrument.

If the recalling waveform is not the stored waveform then the cross-correlation function between the stored (input) signal, $S(t)$ and the recalling waveform, $g(t)$, results at time $T_c$.

Conditions for auto and cross-correlation are the following:
1. The stored signal RF magnetic field amplitude should be much less than the material (inhomogeneous line width);
$H_{rf} << A\gamma a H^*$
2. The stored and recalling signal spectral widths should be considerably less than the material inhomogeneous line width.

2

3. The $\pi/2$ pulse should satisfy the condition:

$$\gamma H_{rf} T_s = \frac{\pi}{2}$$

where $\gamma$ = gyromagnetic ratio
$H_{rf}$ = pulse RF magnetic field amplitude
$T_s$ = pulse time duration 4. The input signal duration should be less than the paramagnetic material spin-spin relaxation time, $T_2$.
5. The signal can be stored for periods not exceeding the spin-lattice relaxation time, $T_1$.

In practice, these conditions can all be simultaneously satisfied to produce usable results. For example, using phosphorous-doped silicon with $1 \times 10^{17}$ donors/cc., signal duration of up to 200 microseconds is possible and this signal can be stored for periods approaching seconds at microwave frequencies. For bandwidths of up to 10 megacycles, the natural resonance line of the material may be used. If more bandwidth is required, then the line may be further broadened by using an inhomogeneous biasing magnetic field. Peak power level requirements for signal and $\pi/2$ pulses are in the order of milliwatts and watts respectively.

It is a principle object of the invention to provide a new and improved radar system spin echo correlator that utilizes the spin properties of paramagnetic materials.

It is another object of the invention to provide a correlator of the type described that produces auto correlation of signals directly at the signal frequency.

It is another object of the invention to provide a spin echo correlator wherein signals can be stored for the spin-lattice relaxation time.

It is another object of the invention to provide a spin echo correlator that has greater waveform versatility than currently available correlators.

It is another object of the invention to provide a spin echo correlator that has greater system reliability than state of the art devices.

It is another object of the invention to provide a spin echo correlator capable of large compression ratios.

These, together with other objects, advantages and features of the invention will become more apparent from the following detailed description taken in conjunction with the illustrative embodiments in the accompanying drawings.

DESCRIPTION OF THE DRAWINGS

FIG. 1a diagrammatically illustrates magnetic field and magnetic moment vectors for an equilibrium condition with a biasing field applied;

FIG. 1b diagrammatically illustrates magnetic field and magnetic moment vectors for an RF magnetic field applied in the x direction;

FIG. 1c diagrammatically illustrates the rotation of the magnetization vectors about the RF field during 90° pulse;

FIG. 1d diagrammatically illustrates the spreading of magnetization components after removal of RF during pulse;

FIG. 2a diagrammatically illustrates a spin packet resonant at $\omega_o$;

FIG. 2b diagrammatically illustrates a spin packet resonant at $\omega_o - \Delta\omega$;

FIG. 2c diagrammatically illustrates a spin packet resonant at $\omega_o + \Delta\omega$;

FIG. 6a illustrates waveforms showing recall of a signal pulse with a 90° recall;

FIG. 6b illustrates waveforms showing recall of multiple signal pulses with a 90° recall;

FIG. 6c illustrates waveforms showing the sequence for reproduction of signal pulse using 90° recall method;

FIG. 7a illustrates waveforms showing the prepulse spin echo technique pulse sequence;

FIG. 7b illustrates waveforms showing the time reversal of a radar pulse using 180° recall method;

FIG. 9b is a sectional view of the spin echo pulse compressor of FIG. 9a; and

FIG. 10 illustrates the RF field configuration of the microwave cavity of FIG. 9a.

DESCRIPTION OF THE PREFERRED EMBODIMENTS

Figure 3:
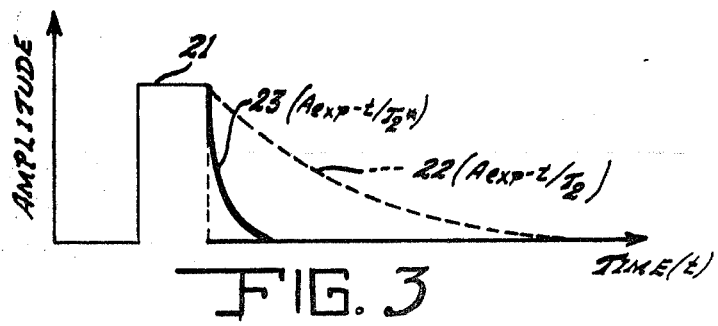
FIG. 3 illustrates the video envelope of a 90° pulse showing free induction decay.

Spin echo apparatus has been disclosed by William B. Mims in the U.S. Pat. No. 3,265,961 entitled *Spin Echo Apparatus* issued Aug. 9, 1966. The application of RF pulse sequence to an ensemble of spins to effect spin echoes has been described by E. L. Hahn in the periodical article *Spin Echoes* published in *Physical Review*, Vol. 80, No. 4, Nov. 15, 1950. Inasmuch as these and other readily available publications review basic spin echo theory in detail, only such theory as is germane to the present invention is herein outlined.

For the purposes of the present invention, a material is chosen which has a resonant line width consisting of both homogeneous and inhomogeneous broadening. The material thus has characteristic phase relaxation times $T_2^*$ and $T_2$.

In the case where this material has DC magnetic field applied along the $\bar{z}$ direction, the magnetic field establishes an equilibrium magnetic moment, $M_o$ in the $\bar{z}$ direction as shown in FIG. 1a. When a 90° RF pulse is applied to this system, if the RF magnetic field is applied in the $\bar{x}$ direction as shown in FIG. 1b, then the magnetization vector will tend to precess about it and the DC field, $H_0$. In order for the RF pulse to be a 90° pulse, several conditions must be met. These are:

1. $\gamma |H_1| T_s = \pi/2$ (2) $$T_s < T_2^* = \frac{2}{\gamma \Delta H} = \frac{2}{\Delta \omega^*}$$

(3) $$H_1 > \frac{\pi}{2} \Delta H^* = \frac{\pi}{2} \left(\frac{2}{\gamma T_2^*}\right)$$

where:

$T_s$ = RF pulse width
$\gamma$ = gyromagnetic ratio (radian units)
$\Delta \omega^*$ = material line width (inhomogeneous)
$|H_1|$ = magnitude of RF magnetic field Condition 1 is simply an energy consideration, i.e., the correct amount of energy must be supplied to the magnetic system to put the net magnetic moment into the equatorial plane.

Condition 2 can be considered a condition on the signal bandwidth and the line width of the material. $\Delta f_{rf} > AQFf^*$ where:

$$\Delta f_{rf} = \frac{2}{T_s} \quad (1)$$

$$\Delta f^* = \frac{1}{\pi T_2^*} = \frac{\gamma \Delta H^*}{\pi} \quad (2)$$

This indicates that the RF spectrum for a pulse should be wider than the spectrum of spin packets within the line width, $\Delta \omega$. If this is the case, then all of the spins in the system will be affected and the magnetization vectors will essentially remain "a point" during the passage from the equilibrium position to the equatorial plane. I.e., the vectors will not have time to spread. (This spreading is caused by the different natural frequencies of the magnetization vectors).

Condition 3 is really a combination of conditions 1 and 2. The magnitude of the RF magnetic field is commonly used as a measure of the spectral width of spin packets effected. An RF magnetic field of magnitude $H_1$ effects a group of spin packets with resonant frequencies approximately $2\gamma H_1$ wide.

When these conditions (1, 2, and 3) are met, the magnetization vectors will rotate through an angle of $\pi/2$ as shown in FIG. 1c. At this time, the RF signal is removed. The magnetization vectors will then precess in the $\bar{x}-\bar{y}$ plane at a rate which is determined by the effective field, $\bar{H}_{er}$, that the spin vector sees in the rotating coordinate frame. Shown in FIG. 1d are three magnetization components, $\bar{m}_o$, $\bar{m}_1$, and $\bar{m}_2$. The component, $\bar{m}_o$, has a natural resonant frequency, $\omega_o$, and sees an effective field given by:

$$\bar{H}_{er} = \left(H_0 - \frac{\omega_0}{\gamma}\right)\bar{k} = (H_0 - H_0)\bar{k} = 0 \quad (3)$$

Therefore, this vector will remain fixed to an observer in the rotating coordinate system as illustrated in FIG. 2a.

The vector, $\bar{m}_1$, has a natural resonant frequency which is slightly lower than $\omega_o$, (i.e., $\omega_o - \Delta\omega$). This magnetization vector will see an effective field given by:

$$\bar{H}_{er} = \left[H_0 - \left(\frac{\omega_0 - \Delta\omega}{\gamma}\right)\right]\bar{k} = \frac{(\Delta\omega)}{\gamma}\bar{k} \quad (4)$$

This spin packet will precess in a clockwise direction at the rate $\Delta\omega = \gamma \bar{H}_{er}$. This is shown in FIG. 2b. For a spin packet which has a natural frequency higher than $\omega_o$, (i.e., $\omega_o + \Delta\omega$), the effective field is:

$$\bar{H}_{er} = \left[H_0 - \left(\frac{\omega_0 + \Delta\omega}{\gamma}\right)\right]\bar{k} = -\frac{\Delta\omega}{\gamma}\bar{k} \quad (5)$$

and the vector will precess in a counterclockwise direction as shown in FIG. 2c.

Extending this to spin packets biased in a continuous manner between $\omega_o + \Delta\omega$ and $\omega_o \Delta\omega$, it can be seen that the packets will fan out quickly into equatorial plane and after time $T_2^*$ will not be sensed by a detector. FIG. 3 shows the normal video envelope 21 including the free induction decay tail portion 23, which would be observed on an oscilloscope. Also shown by dashed line 22 is the limit of the free induction signal which occurs when $T_2^* = T_2$. This condition is met when the spin packets (effected by the pulse) are homogeneous (i.e., they all have the same natural resonant frequency).

The case previously mentioned where a 90° pulse is applied to a spin system and the spins are allowed to go out of phase in the time $T_2^*$ is now considered. At some time ($T_2^* < T < T_2$) after the application of the 90° pulse, the process can be reversed. That is to say, the spins which are falling out of phase can be caused to reverse this process and come back in phase. They will momentarily have the same phase at a time 2T. Thus, there is obtained a spin echo of the 90° pulse which has been delayed for a time 2T, (provided that $2T < T_2$).

Figure 4:
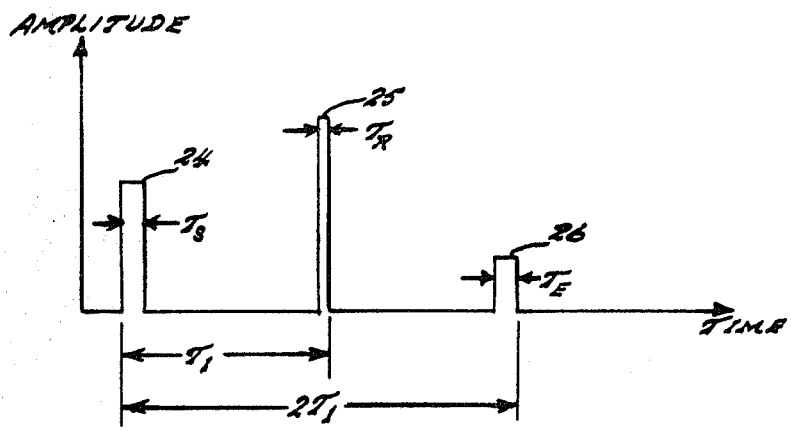
FIG. 4 illustrates waveforms showing time sequence in $\pi$ recall method of producing spin echoes.

This command, which causes the rate of phase advance to change to an equal rate of phase retardation, or vice versa, is called the "recall" and can be accomplished in two ways. One is to suddenly reverse the direction of the DC biased magnetic field. The other (more easily performed) is to apply a very short duration 180° RF pulse which flips the magnetization vectors 180° relative to the DC magnetic field. These two techniques really accomplish the exact same thing—that is, they simply change the relative direction of the DC field and the magnetization vectors by 180°. The sequence of events is illustrated in FIG. 4 by $\pi/2$ signal pulse 24, recall pulse 25, and spin echo pulse 26. A detailed description of this sequence is described by H. Y. Carr and E. M. Purcell in the periodical article Effects of Diffusion on Free Precession in Nuclear Magnetic Resonance Experiments published in Physical Review Vol. 94 No. 3 May 1, 1954.

In the sequence shown in FIG. 4, the first pulse can be considered the input signal. It is instructive to consider the echo and conditions for a coherent replica of the input signal. In general, the following applies. The magnitude of the RF magnetic field of the input signal should be much less than the inhomogeneous line width of the material. $H_1 \ll \Delta H^*$ This is the opposite condition to the 90° input signal which was previously discussed. Also, the second pulse called the 180° recall pulse should be short and intense. That is, the conditions on this pulse are identical to the 90° signal with the exception of Condition 1 which becomes: $\gamma H_1 T_s \approx 8 \times \pi$ If these conditions are met, the echo is a replica of the input signal but is reversed in time (mirror image of input signal).

Figure 5:
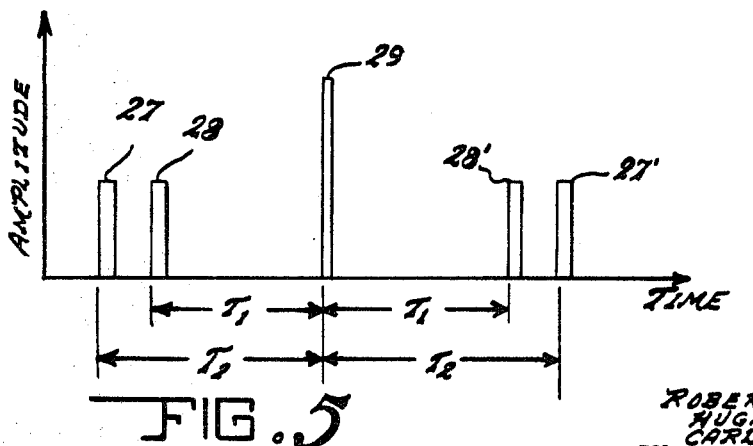
FIG. 5 illustrates waveforms showing $\pi$ recall of two 90° input signals having time reversal of echoes.

The production of a "mirror image" echo is best illustrated by considering two input signals 27 and 28 at the same frequency but separated in time as shown in FIG. 5. Both signals are recalled by the same 180° pulse 29 but the echoes 27' and 28' appear symmetrically (in time) about the recall pulse. This applies equally well for any input signal, continuous or discrete, including such waveforms as the linear FM "chirp."

Signal storage times using the $\pi$ recall method are limited to the spin-spin relaxation time, $T_2$. For example, in phosphorus-doped silicon ($10^{17}$P/cc.), $T_2$ is approximately 200 microseconds.

Another RF pulse sequence for producing spin echoes is called the $\pi/2$ recall or $\pi/2$ prepulse method. The sequence as illustrated in FIG. 6a is as follows:

1. A 90° prepulse 30 at the time $t=0$
2. A signal pulse 31 at the time $t=T_1$
3. A 90° recall pulse 32 at the time $t=T$ With this sequence, an echo 33 appears at the time $t=T+T_1$. (So long as the signal pulse is stored before the time $T_1<T_2$). The essential point in the process is that the echo which results survives for the spin-lattice relaxation time $T_1$, rather than the spin-spin relaxation time $T_2$. For example, in phosphorus-doped silicon $T_1$ is a few seconds. The reason for the long period of storage is that the $\overline{m}$ components of the magnetization vectors are stored along the Zeeman (biasing field) direction. Only the spin-lattice decay $T_1$ is important for these components and therefore storage times approaching $T_1$ result.

Another important property of this $\pi/2$ prepulse sequence is that if two signal pulses 34 and 35 are put in as shown in FIG. 6b, the echoes 36 and 37 appear in normal rather than imaged order. Referring to FIG. 6b, echo 36 from signal 34 occurs at time $T+T_a$ and echo 37 occurs at time $T+T_b$. The essential point is that the echo appears (after recall) at a time which depends upon the time between the signal pulse and the prepulse. This will be important when pulse compression is described in subsequent paragraphs.

Another important question involving this technique is whether signals can be stored coherently for the period $T_1$. FIG. 6c illustrates a sequence where this is possible. The prepulse 30 and recall pulse 32 are short ($T<T_2^*$) and intense (90°) pulses. The input signal 39 is relatively low level. (The level of the RF magnetic field is perhaps an order of magnitude less than the inhomogeneous line width). When this procedure is followed (and, of course, the prepulse and recall pulse spectra are centered approximately on the signal spectrum) a coherent echo 40 results.

The pulse sequence utilized in the prepulse spin echo technique of the present invention is illustrated in FIGS. 7a and 7b. "Chirp" signals are used for simplicity of illustration.

The initial pulse 41 is a 90° prepulse. The second pulse 42 is the reversed radar signal pulse. The third pulse 43 is the recall pulse producing an echo at time $T_E$, where: $t_E=t_{II}+(t_I+T_s)$ (7)

A compressed echo occurs if the signal and recall pulses 42 and 43 are time reversed as shown in FIG.7a. In practice it would be simplest to time reverse a sample of the radar signal and store it in a spin echo pulse compression unit. The returning radar echo would then act as the recall signal. This sequence is illustrated by radar signal 44, 180° recall signal 45 and time reversed radar signal 46 of FIG. 7b.

Figure 8:
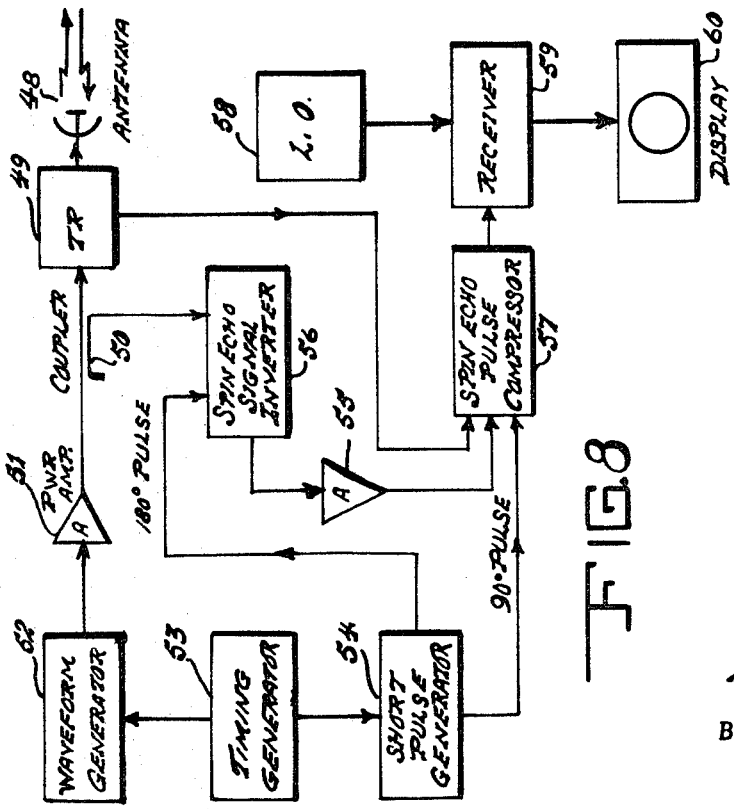
FIG. 8 is a block diagram of a radar system employing prepulse spin echo apparatus.

FIG. 8 is a block diagram of a radar system using the prepulse spin echo technique of the present invention. Such a system includes antenna 48, transmit receive unit 49, coupler 50, power amplifier 51, waveform generator 52, timing generator 53, short pulse generator 54, amplifier 55, spin echo signal inverter 56, spin echo pulse compressor 57, oscillator 58, receiver 59 and display 60. A microwave coupler 50 is used to sample a portion of of the transmitted radar signal. The signal is reversed (in time) using the $\pi$ recall technique. The time-reversed sample of the transmitter waveform is then stored in the spin echo pulse compression device. The returning radar echoes act as recall signals producing pulse compressed echoes.

This, of course, is only one possible version of the device. For example, standard hetrodyning and filtering techniques can be used to time reverse the radar echo instead of reversing the transmitter pulse. This, however, would be more complex and would require more operations with the radar echo thereby decreasing attainable signal to noise ratio.

Typical signal characteristics of the system are the following. The prepulse should be a 90° pulse. The duration, $T_p$, should be less than $T_2^*$. For most applications, a duration of 100 nanoseconds should suffice. Peak power level of the prepulse would be in the order of 10 watts depending upon device insertion loss. The signal pulse duration, $T_s$, will be the radar pulse duration and the peak power level will be in the 1 milliwatt range; again depending upon device insertion loss. Returning radar echoes will be amplified by a low-noise amplifier. These echoes, however, should be at a relatively low-power level (microwatt range) after amplification to insure system linearity (compressed echo amplitude linearly related to the amplitude of the returning radar echo).

Signal characteristics, in the time reversal sequence, are the following. The sampled signal from the transmitter would be a milliwatt peak power signal. The $\pi$ recall signal would be a short ($\tau_R<100$ nanosecond), relatively high-power ($P_p=10$ watts) pulse. The echo level, of course, would depend upon insertion loss. Amplification between the spin echo signal reversal unit and the pulse compression unit would be required.

In practice, more general waveforms than the "chirp" waveform can be compressed using the prepulse spin echo technique. The requirement is that the stored signal and recall signal be reversed in time. This "mirror image" property suggests an autocorrelation mode of operation.

Figure 9A:
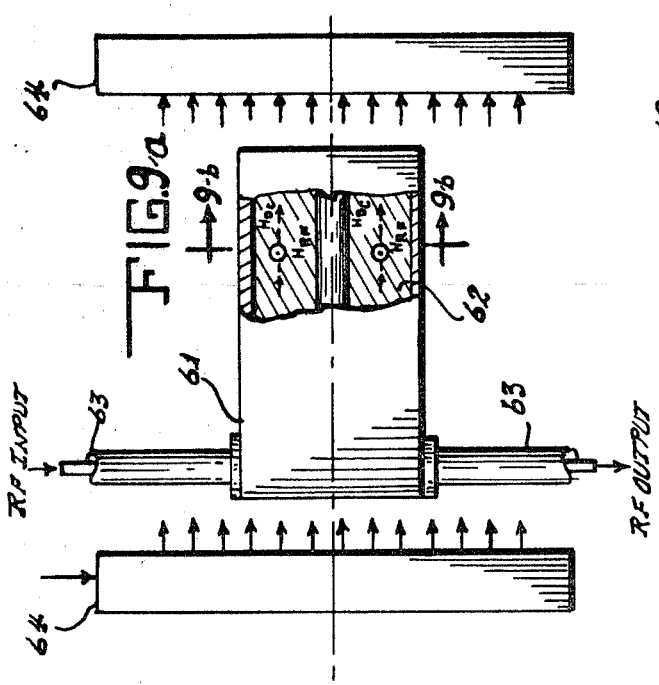
FIG. 9a is a partially cutaway view of a microwave cavity comprising the spin echo pulse compressor of the invention.
Figure 9B:
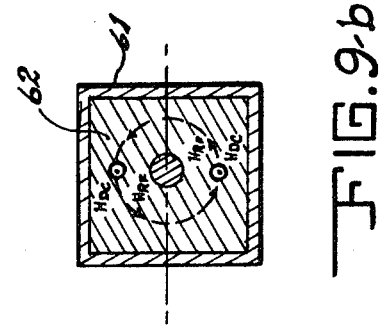
Figure 10:
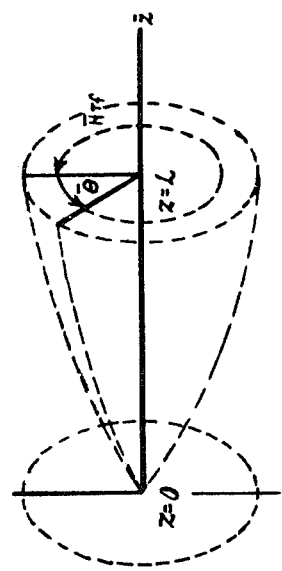

FIGS. 9a and 9b illustrate the basis of a spin echo device. The microwave circuit, for illustrative purposes, is a quarter wavelength coaxial cavity 61 filled with paramagnetic material 62. The DC magnetic field applied by magnetic pole pieces 64 is in the $\overline{z}$ direction and is orthogonal to the RF magnetic field which is in the $\overline{\theta}$ direction. Signals are injected to the cavity through coaxial lines 63 with electric field coupling. The magnitude of the RF magnetic field has a $\overline{z}$ dependence as shown in FIG. 10.

Biasing magnetic field requirements are not stringent since there is no requirement for extreme field homogeneity. In fact, for wideband devices it may be desirable to purposely (spatially) taper the field. DC Field strengths from one thousand to a few thousand gauss are necessary for operation in the microwave region. Such field strengths are readily attainable in a reasonable magnet size.

A simple approach to coupling to the magnetic spin system is here developed for the microwave cavity.

The microwave power absorbed by the magnetic system per unit volume is given by the expression:

$$P_a = -\tfrac{1}{2}\omega\mu_0 x'' HH^* \qquad (8)$$

where:
$\omega$ = radian frequency
$\mu_o$ = static magnetic permeability
$x$ = imaginary part of magnetic susceptibility
H = magnitude of RF magnetic field (linearly polarized)
Considering an isotropic material for simplicity, the total power absorbed is the integral of the field over the entire material.

$$P_a = \tfrac{1}{2}\omega x'' \int_V \mu_0 H_m^2 dv \qquad (9)$$

For a cavity, the loaded Q is given by the expression:

$$Q_l = \frac{\omega E_s}{P_l} \qquad (10)$$

where:
$E_s$ = energy stored in cavity $P_1$ = power lost in cavity

In the cavity, the power lost is the power supplied by the external circuit. The energy sorted is the integral of the magnetic field over the volume of the cavity.

$$P_1 = P_{in}$$
$$E = \int_V \mu_0 H_c^2 dV \quad (11)$$

Substituting these two expressions in equation (10), the following result is obtained:

$$P_{in} = \frac{\omega \int_V \mu_0 H_c^2 dV}{Q_1} \quad (12)$$

Solving for the volume integral in equation (9) there is obtained:

$$\int_V \mu_0 H_m^2 dV = \frac{2P_a}{\omega x''} \quad (13)$$

Recognizing that the volume integral in equation (11) and equation (13) differ only by the cavity filling factor $\eta$:

$$\int_V \mu_0 H_m^2 dV = \eta \int_V \mu_0 H_c^2 dV$$

where:

$$\eta \leq 1$$

After rearranging terms and using equations (9) and (12), there is obtained an expression for the ratio of the power absorbed by the magnetic system to the input power:

$$\frac{P_a}{P_{in}} = \frac{\eta}{2} x'' Q_1 \quad (14)$$

$x''$ is given by the following expression:

$$x'' = \frac{K}{T} \frac{\omega_0 T_2^* N}{[1 + (T_2 \Delta \omega)^2]} \quad (15)$$

where
$N$ = spin density (spins/M³)
$\omega_0$ = resonant frequency of spin system (radian units)
$T_2^*$ = the phase coherence time for the material
$\Delta \omega = (\omega - \omega_0)$ (radian units)
$T$ = temperature in degrees Kelvin
$K = \left(\frac{g\beta^2}{4k}\right)\mu_0 \approx 7.8 \times 10^{-30}$ (MKS units)

Substituting equation (15) into equation (14) there is obtained:

$$\frac{P_a}{P_{in}} = \frac{\eta K O_e N \omega_0 T_2^*}{2T[1 + T_2^{*2} \Delta \omega^2]} \quad (16)$$

Considering coupling to the spin system when one is exactly at resonance, i.e., $\Delta \omega = \omega - \omega_0 \approx 0$. Equation (16) reduces to:

$$\frac{P_a}{P_{in}} = \frac{\eta K O_e N \omega_0 T_2^*}{2T} \quad (17)$$

From this expression it is seen that the coupling improves directly with, (1) the density of spins in the material, (2) the frequency, (3) the Q of the cavity, and (4) with the phase coherence time, $T_2^*$. The coupling varies inversely with temperature.

Examining each of these factors individually, it is determined that:

1. The spin density (N) of the material cannot be increased indefinitely as the spin-spin relaxation time ($T_2$) and spin density are related. For example, in P-doped silicon, an increase in spin density beyond $10^{17}/cm^3$ results in a rapid decrease in $T_2$. Below this level of spin density, $T_2$ and N are relatively unrelated.

2. The coupling improves directly with frequency. The resonant frequency of the spin system can be changed by changing the biasing magnetic field. The relationship is:

$$f_0 = \gamma' H_0$$

where:
$\gamma'$ = gyromagnetic ratio $\approx$ 2.8 MHz./gauss
$H_0$ = magnitude of the magnetic biasing field 3. Coupling is inversely proportional to temperature (first order effect).

4. The parameters $Q_e$ and $T_2^*$ are related to bandwidth. $T_2^*$ is inversely related to the material line width. The cavity Q should be such that the cavity band-pass is equal to or greater than the material line width. This puts an upper limit on $Q_e$.

Using typical values of the above parameters and assuming operation at 3.0 GHz., one obtains the following value of coupling:

$$\frac{P_a}{P_{in}} = \frac{\eta K O_e N \omega_0 T_2^*}{2T} \approx (20 \text{ db}) \quad (18)$$

with
$K = 7.8 \times 10^{130}$ (MKS units)
$\omega_0 = 2\pi 3 10^9 = 6\pi \times 10^9$ rad/sec.
$T_2^* = \times 10^{-8}$ sec.
$T = 4.2°$ (degrees Kelvin)
$N = 1 \times 10^{23}$ spins/M³ ($1 \times 10^{17}$ spins/cm³)
$Q_e = 300$ (10 MHz. BW at 3.0 GHz.)
$\eta = 1.0$ The total insertion loss would be twice this figure or 40 db. Although this is not particularly low, it can be improved.

Two factors limiting achievable pulse compression ratios are the spin-spin relaxation time, $T_2$ and the phase coherence time, $T_2^*$. The pulse compression ratio can alternatively be described by the bandwidth time product of the signal.

$$BT_{max} = \frac{T_2}{T_2^*} \quad (19)$$

Current materials such as phosphorus-doped silicon yield maximum B T products in the order of $10^4$ ($T_2 \approx 10^{14}$ sec., $T_2^* \approx 10^{18}$ sec.). This limitation occurs due to the following reasons. In the technique of the present invention the radar signal must be stored before the time $T_2$ elapses, limiting signal duration. The signal bandwidth can be no greater than material line width and $T_2^*$ is inversely related to this parameter.

Spin-spin relaxation time is limited by the particular material used. $T_2^*$, on the other hand, can be decreased by inhomogeneously broadening the material line width. (For example, by spatial tapering of the biasing magnetic field). The limit to this process, however, is in device insertion loss. If the bandwidth is increased by tapering the biasing field, the effective number of spins per spin packet decreases, increasing insertion loss. If the spin density is increased to offset this, the spin-spin relaxation time ($T_2$) decreases defeating the purpose of the increase in spin density.

It will be understood that various changes in the detailed materials and arrangement of arts which have been herein described and illustrated in order to explain the nature of the invention may be made by those skilled in the art within the spirit and scope of the invention as expressed in the appended claims.

We claim:

1. In combination with a radar system, signal correlator means comprising spin echo pulse compression means, means for generating and delivering thereto a 90° prepulse signal, means for obtaining a sample of an RF signal transmitted by said radar system, means connected thereto for reversing said sample in time, means for delivering said time-reversed sample of said pulse compression means for storage therein, and means for delivering the received echo pulse of said transmitted signal to said pulse compressor means.

2. Signal correlator means as defined in claim 1 wherein said spin echo pulse compressor means comprises a quarter wavelength coaxial cavity filled with paramagnetic material, means for applying a DC magnetic field in the z direction of said paramagnetic material, and, coaxial means for coupling said RF signal samples to said cavity such that the RF magnetic field is in the $\theta$ direction of said paramagnetic material.

3. Signal correlator means as defined in claim 2 wherein the RF magnetic field amplitude of stored RF signal samples is substantially less than the inhomogeneous line width of said paramagnetic material, the spectral widths of said RF samples and said received echo pulses are less than the inhomogeneous line width of said paramagnetic material, said 90° prepulse signal satisfies the condition
the RF signal sample duration is less than the paramagnetic material spin-spin relaxation time.

4. Signal correlator means as defined in claim 3 wherein said paramagnetic material comprises phosphorous-doped silicon.